United States Patent
Shoykhet et al.

(10) Patent No.: US 12,535,466 B2
(45) Date of Patent: Jan. 27, 2026

(54) FLUIDIC ROTARY VALVE

(71) Applicant: Agilent Technologies, Inc., Santa Clara, CA (US)

(72) Inventors: Konstantin Shoykhet, Karlsruhe (DE); Thomas Ortmann, Straubenhardt/Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 307 days.

(21) Appl. No.: 18/265,923

(22) PCT Filed: Dec. 7, 2021

(86) PCT No.: PCT/IB2021/061396
§ 371 (c)(1),
(2) Date: Jun. 7, 2023

(87) PCT Pub. No.: WO2022/130120
PCT Pub. Date: Jun. 23, 2022

(65) Prior Publication Data
US 2024/0027407 A1    Jan. 25, 2024

(30) Foreign Application Priority Data
Dec. 14, 2020 (DE) .......................... 102020133427.3

(51) Int. Cl.
*G01N 30/20* (2006.01)
*B01D 15/14* (2006.01)
*G01N 30/02* (2006.01)

(52) U.S. Cl.
CPC ............ *G01N 30/20* (2013.01); *B01D 15/14* (2013.01); *G01N 2030/027* (2013.01); *G01N 2030/201* (2013.01); *G01N 2030/202* (2013.01)

(58) Field of Classification Search
CPC ............ G01N 30/20; G01N 2030/027; G01N 2030/201; G01N 2030/202;
(Continued)

(56) References Cited

U.S. PATENT DOCUMENTS

| 3,376,694 A | 4/1968 | Owens et al. |
| 3,916,692 A | 11/1975 | Abrahams et al. |

(Continued)

FOREIGN PATENT DOCUMENTS

| DE | 102013215065 A1 | 2/2015 |
| EP | 0309596 B1 | 3/1993 |

OTHER PUBLICATIONS

Disclosed Anonymously,"Split Closed Groove In Fluidic Valves Preventing Fluid Stagnation Sections Ed—Darl Kuhn," An IP.com Prior Art Database Technical Disclosure; Jan. 16, 2021; 7 Pages.
(Continued)

*Primary Examiner* — Robert R Raevis

(57) ABSTRACT

A fluid valve, for a sample separation device such as for liquid chromatography, includes a rotor, a stator, and external terminals for fluidically connecting one or more components. By rotating the rotor, different fluidic coupling and/or decoupling states between components are adjustable. Ports are connectable with one or more external terminals. A first channel is formed along a first circular path. A second channel includes a first coupling point located on the first circular path and a second coupling point located on a second circular path. By rotating the rotor, a fluidic coupling between a first port and a second port can be established, by the first channel being connected with the first port and at least the first coupling point with the second channel, and by the second channel being connected at least via the second coupling point with the second port.

17 Claims, 5 Drawing Sheets

(58) Field of Classification Search
CPC ....... G01N 2030/025; G01N 2030/207; B01D 15/14; F16K 11/0743
USPC ..... 73/61.56, 23.22, 863.73, 864.83; 422/70, 422/89, 539
See application file for complete search history.

(56) References Cited

U.S. PATENT DOCUMENTS

| | | |
|---|---|---|
| 4,625,569 A | 12/1986 | Toei et al. |
| 4,939,943 A | 7/1990 | Strohmeier |
| 10,261,056 B2 | 4/2019 | Olovsson |
| 2006/0260700 A1 | 11/2006 | Bauerle et al. |
| 2016/0310870 A1 | 10/2016 | Olovsson |
| 2017/0321813 A1 | 11/2017 | Olovsson et al. |

OTHER PUBLICATIONS

PCT Notification of Transmittal of The International Search Report & Written Opinion mailed on Feb. 28, 2022 for Application No. PCT/IB2021/061396; 18 Pages.

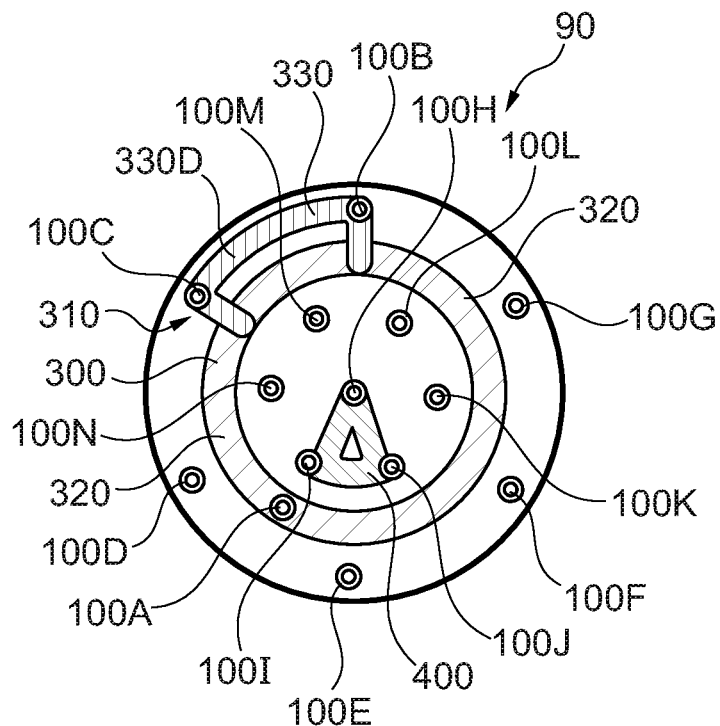
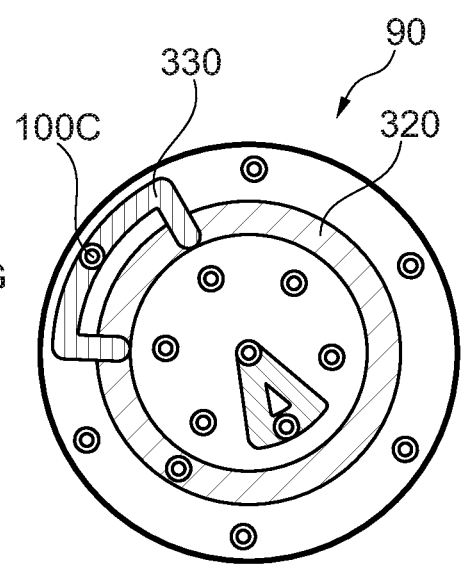
Fig. 4A
Fig. 4B
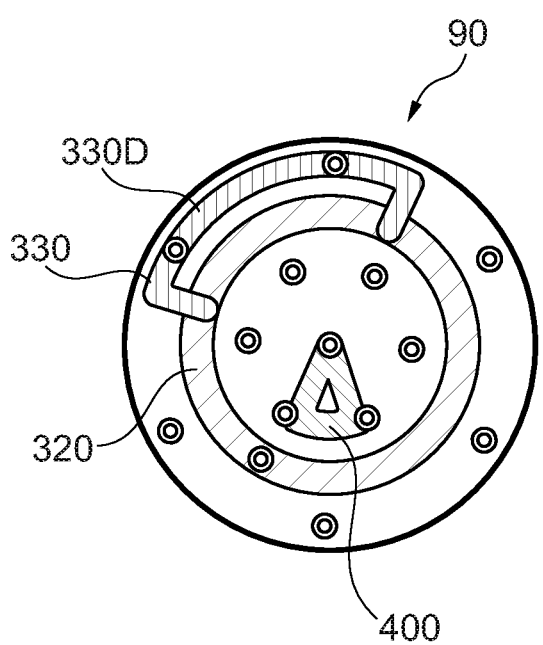
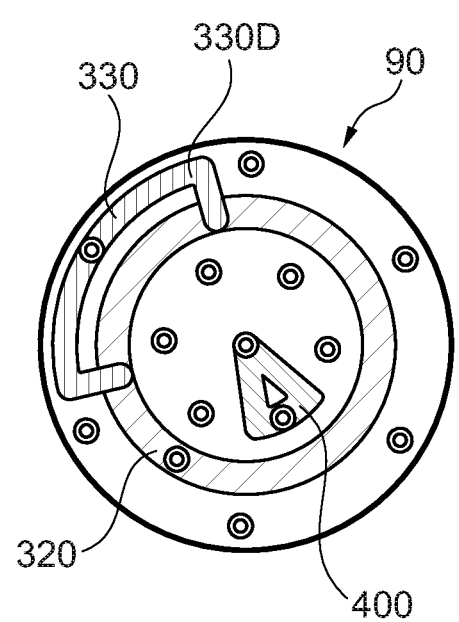
Fig. 4C
Fig. 4D

FLUIDIC ROTARY VALVE

RELATED APPLICATIONS

This application is the national stage under 35 U.S.C. 371 of International Application No. PCT/IB2021/061396, filed Dec. 7, 2021; which claims priority to German Application No. DE 10 2020 133 427.3, filed Dec. 14, 2020; the entire contents of each of which are incorporated by reference herein.

TECHNICAL FIELD

The present invention relates to a fluidic rotary valve, in particular for a sample separation device for separating sample components of a fluidic sample.

BACKGROUND

In liquid chromatography, in particular high-performance liquid chromatography (HPLC), typically a liquid (mobile phase) with a highly precisely controlled flow rate (for example in the range of microliters to milliliters per minute) and at a high pressure (typically 20 to 1000 bar and above, currently up to 2000 bar), where the compressibility of the liquid is noticeable, is moved through a stationary phase (for example a chromatographic column), to separate single components of a sample liquid from each other which is introduced in the mobile phase. Such a HPLC-system is known from EP309596B1 of the same applicant, for example.

For liquid chromatography, it is required to introduce a fluid sample to be analyzed into the system. Such systems for introducing (also denoted as injecting or inserting) a fluid sample are known from U.S. Pat. Nos. 4,939,943, 3,916,692 or 3,376,694.

In such and in other measuring devices, an injector which includes an injection loop may thus be provided for introducing a fluid sample in a path between a high-pressure pump and a separation column. In such an injector loop, a needle may be arranged in a seat, wherein the needle extends out of the seat for receiving the fluid sample, immerses in a sample container for sucking-in the fluid sample, and subsequently retracts back in the seat. After switching a fluid valve which is configured as an injection valve, the such received fluid sample is brought in the high-pressure path between the high-pressure pump and the separation column. Also at other locations of such a measuring device, fluid valves are used.

Thus, in such and in other systems, a fluid flow may be controlled by one or more fluid valves which may be in fluid connection with one or more separation columns and may control and/or switch the liquid supply to the separation column or separation columns, for example. Such fluid valves may comprise a stator with connection ports and a rotor with channels, wherein the connection ports may be statically connected to fluid conduits and the channels can be rotated by the rotor, to therefore fluidically couple, in different switching positions, different ones of the connection ports by a respective channel, and to fluidically decouple other ones of the connection ports.

In such rotational fluid valves, the channels have a length which bridges the required angle range for forming a connected state between two connection ports. The ends of such a channel may form blind holes in which stagnation zones may form which may be filled with standing liquid. When the flow changes or when different samples are analyzed, this may lead to an undesired carryover of previous solvent material and/or sample material.

In such and in other fluidic systems, an operation of a fluid valve with the described channels may thus be at risk that non-rinsed channel regions in the fluidic system cause a stay of fluid over a long time period in the fluidic system and thereby impede the error-free operation of the fluidic system.

From DE 10 2013 215 065 A1 of the same applicant, a fluid valve is known which achieves an improved operability by an annular channel structure.

SUMMARY

It is an object of the present disclosure to provide a fluid valve for a fluidic system, wherein standing or non-rinsed fluid regions are avoided.

An embodiment of the present disclosure relates to a fluid valve, in particular for a sample separation device for separating at least one fluid component of a fluidic sample. The fluid valve comprises a plurality of external terminals for fluidically connecting a respective fluidic component part, and a rotor, and a stator, wherein, by rotating the rotor around a rotation axis, different fluidic coupling states and/or decoupling states between fluidic component parts which are connected to the fluid valve are adjustable. One or more of the plurality of external terminals may be located at or in the stator. The fluid valve comprises a plurality of ports which respectively are or may be fluidically connected with at least one of the external terminals, wherein a first port of the plurality of ports is located on a first circular path around the rotation axis of the rotor, and a second port of the plurality of ports is located on a second circular path around the rotation axis of the rotor. The fluid valve further comprises a first channel which is formed at least in portions along the first circular path, and a second channel which comprises or may comprise a first coupling point and a second coupling point, wherein the first coupling point is located on the first circular path, and the second coupling point is located on the second circular path. The first channel is formed by the stator and the second channel is formed by the rotor, or vice versa. By rotating the rotor with respect to the stator, a fluidic coupling between the first port and the second port can be established, by the first channel being connected with the first port and at least via the first coupling point with the second channel, and the second channel being connected at least via the second coupling point with the second port. By such fluid valves, standing or non-rinsed fluid regions may be avoided.

In an embodiment, the first coupling point constitutes a first end of the second channel. Additionally or alternatively, the first coupling point may constitute a point or region, via which the second channel is fluidically coupled with the first channel.

In an embodiment, the second coupling point constitutes a point or region, via which the second channel is fluidically connected with the second port.

It is to be understood that the coupling points which are illustrated in the foregoing and in the following do not have, or do not need to have, a fixed position or a fixed extension relative to a certain circular path, but constitute a fluidic coupling which is created by a relative position or positioning between channels and/or ports. For example, the first coupling point in a position may constitute a (more or less spatially pronounced) point between the first channel and the second channel, in which the respective ends of the first and the second channel abut or (slightly) overlap. In a further position, for example the first coupling point between the first and the second channel can respectively constitute a portion both on the first and on the second channel, in which both channels overlap each other. In other words, these "features", for example that a channel comprises a certain portion and/or a channel comprises a certain coupling point, may be the capability to achieve the described states, but are not mandatorily permanently existing features.

In an embodiment, the second channel comprises a third coupling point which is located on a third circular path around the rotation axis of the rotor, wherein the third circular path and the second and first circular path may have the same radius around the rotation axis. Alternatively, the third circular path may have the same radius as the second circular path or may have a radius which is different from the radiuses of the first and the second circular paths.

In an embodiment, the second channel comprises a first portion which is located on the first circular path, wherein the first coupling point is located in the first portion.

In an embodiment, the second channel comprises a second portion which is located on the second circular path, wherein the second portion extends at least between two ports which are located on the second circular path. This enables a coupling in the sense of a "make before break", i.e., for a transition period, both ports which are located on the second circular path are fluidically connected with each other, wherein before and after the transition period, respectively only one of both ports is fluidically coupled.

In an embodiment, the second channel comprises a fourth coupling point which is located on the second circular path, and a second portion which extends between the second coupling point and the fourth coupling point, wherein the second coupling point is connected with the second port and the fourth coupling point is connected with a third port which is located on the second circular path.

In an embodiment, the fourth coupling point constitutes a point or region, via which the second channel is fluidically connected with the third port.

In an embodiment, the third coupling point constitutes a second end of the second channel.

In an embodiment, the third coupling point constitutes a point or region, via which the second channel is fluidically connected with the first channel.

In an embodiment, the third coupling point and the first coupling point coincide.

In an embodiment, the third coupling point and the first coupling point overlap.

In an embodiment, the third coupling point and the first coupling point are located at different positions of the second channel.

In an embodiment, the second channel comprises a third portion which is located on the third circular path, wherein the third coupling point is located in the third portion.

In an embodiment, in the fluidic coupling between the first port and the second port which is established by rotating the rotor with respect to the stator, the first port is connected with the first channel, wherein the first channel is connected at least via the first coupling point with the second channel, and the second channel is connected at least via the second coupling point with the second port.

In an embodiment, in the fluidic coupling between the first port and the second port which is established by rotating the rotor with respect to the stator, the first port is connected with the first channel, wherein the first channel is connected at least via the first coupling point and at least via the third coupling point with the second channel, and the second channel is connected at least via the second coupling point with the second port.

In an embodiment, the fluidic coupling between the first port which is established by rotating the rotor with respect to the stator comprises an annularly closed channel (or closed ring-shaped channel, or closed-loop channel), i.e., the fluidic coupling may include the annularly closed channel. In such an embodiment, it may be sufficient that a subsection may be formed as an annular channel.

In an embodiment, in the fluidic coupling between the first port and the second port which is established by rotating the rotor with respect to the stator, the first port and the second port are connected by an annularly closed channel (or closed ring-shaped channel), so that the first port is connected with the second port both via a first fluidic path and via a second fluidic path of the annularly closed channel.

In an embodiment, the fluidic coupling between the first port and the second port which is established by rotating the rotor with respect to the stator, the first port is connected with the second port both via a first fluidic path and via a second fluidic path.

In an embodiment, the first fluidic path is constituted by a first subregion of the first channel and a first subregion of the second channel. The first subregion of the first channel extends between the first port and the first coupling point, and the first subregion of the second channel extends between the first coupling point and the second port.

In an embodiment, the second fluidic path is constituted by a second subregion of the first channel and a second subregion of the second channel. The second subregion of the first channel extends between the first port and the third coupling point, and the second subregion of the second channel extends between the third coupling point and the second port.

In an embodiment, the fluid valve is a shear valve.

In an embodiment, the first channel is formed by the stator, such as by an indentation (such as a groove) in a surface of the stator which is opposing to the rotor.

In an embodiment, the second channel is formed by the rotor, such as by an indentation (such as a groove) in a surface of the rotor which is opposing to the stator.

In an embodiment, the stator comprises the plurality of external terminals.

In an embodiment, the stator comprises the plurality of ports, such as respectively as an indentation in a surface of the stator which is opposing to the rotor.

In an embodiment, the stator comprises a plurality of fluidic connections, to respectively connect one or more of the plurality of external terminals with one or more of the plurality of ports.

An embodiment of the present disclosure relates to a fluid valve, in particular for a sample separation device for separating at least one sample component of a fluidic sample. The fluid valve comprises a plurality of external terminals for fluidically connecting a respective fluidic component part, and a rotor, and a stator. By rotating the rotor around a rotation axis, different fluidic coupling states and/or decoupling states between fluidic component parts which are connected to the fluid valve are adjustable. One or more of the plurality of external terminals may be located at or in the stator. The fluid valve comprises a plurality of ports which are respectively fluidically connected with at least one of the external terminals, wherein a first port of the plurality of ports is located on a first circular path around the rotation axis of the rotor, and a second port of the plurality of ports is located on a second circular path around the rotation axis of the rotor. The fluid valve comprises a first channel which is formed in an annular manner along the first circular path, and a second channel. The second channel comprises a first coupling point, a second coupling point, and a third coupling point. The first coupling point and the third coupling point are located on the first circular path, and the second coupling point is located on the second circular path, so that the second channel, together with the region of the first channel which is located between the first coupling point and the third coupling point, constitutes an annularly closed channel (or closed ring-shaped channel). By rotating the rotor with respect to the stator, a fluidic coupling between the first port and the second port can be established, by the first channel being connected with the first port, the first channel being connected via the first coupling point and via the third coupling point with the second channel, and the second channel being connected at least via the second coupling point with the second port. By such fluid valves, standing or non-rinsed fluid regions may be avoided by the annularly closed channel. An embodiment of the present disclosure relates to a fluid valve, in particular for a sample separation device for separating at least one sample component of a fluidic sample. The fluid valve comprises a plurality of external terminals for fluidically connecting a respective fluidic component part, and a rotor, and a stator, wherein, by rotating the rotor around a rotation axis, different fluidic coupling states and/or decoupling states between component parts which are fluidically connected to the fluid valve are adjustable. One or more of the plurality of external terminals may be located at or in the stator. The fluid valve comprises a first port and a second port which are respectively fluidically connected with at least one of the external terminals. The fluid valve further comprises a first channel which is formed by the stator, such as by an indentation in a surface of the stator which is opposing to the rotor, and a second channel which is formed by the rotor, such as by an indentation in a surface of the rotor which is opposing to the stator. By rotating the rotor with respect to the stator, the first channel can be fluidically coupled with the second channel, so that an annularly closed channel between the first port and the second port is established, and the first channel is connected with the first port, and the second channel is connected with the second port. By such fluid valves, standing or non-rinsed fluid regions may be avoided, in particular by the annularly closed channel.

In an embodiment, the annularly closed channel is not completely located on a circular path around the rotation axis of the rotor.

In an embodiment, the annularly closed channel comprises different radial distances to the rotation axis of the rotor.

In an embodiment, the annularly closed channel is not completely located within the same plane, for example, parts of the annularly closed channel may be located on different sides of a boundary plane between the rotor and the stator.

In an embodiment, the fluid valve is configured for connecting a first terminal of a first subset of the terminals with a port of the second subset of the terminals. The fluid valve may be configured for connecting a second terminal of a first subset of the terminals with a further port of the second subset of the terminals.

In an embodiment, the fluid valve is configured for selecting, from a plurality of elements, one of the elements. The fluid valve may be configured for switching between multiple chromatographic columns, to select one of these columns and to fluidically couple with it, for example. Alternatively, the fluid valve may be adapted for switching between multiple sample storages, to fluidically couple with one of the sample storages, for example. For example, such a sample storage may be a sample loop, a trap column, or any other volume which is capable for temporarily store a fluidic sample, to inject it in the sample separation device at a later point in time, for the sample being chromatographically separated. This may be utilized both in a one-dimensional and a multi-dimensional chromatographic arrangement.

An embodiment relates to a sample separation device for separating at least one sample component of a fluidic sample, wherein the sample separation device comprises a fluid valve according to one of the previously mentioned embodiments.

In an embodiment, the sample separation device comprises a sample injector for an injection of the sample in a mobile phase in a separation path between a pump for moving the mobile phase and a separation column for separating different fractions of the sample in the mobile phase. By moving the first valve body and the second valve body relative to each other, the fluid valve is switchable, to inject the sample from the sample injector in the separation path.

An embodiment of the present disclosure relates to a method for switching a fluid valve, in particular for a sample separation device for separating at least one sample component of a fluidic sample. The fluid valve comprises a plurality of external terminals for fluidically connecting a respective fluidic component part, and a rotor, and a stator, wherein, by rotating the rotor around a rotation axis, different fluidic coupling states and/or decoupling states between fluidic component parts which are connected to the fluid valve are adjustable. One or more of the plurality of external terminals may be located at or in the stator. The fluid valve comprises a first port and a second port which are respectively fluidically connected with at least one of the external terminals. The fluid valve further comprises a first channel which is formed by the stator, such as by an indentation in a surface of the stator which is opposing to the rotor, and a second channel which is formed by the rotor, such as by an indentation in a surface of the rotor which is opposing to the stator. By rotating the rotor with respect to the stator, the first channel is fluidically coupled with the second channel, so that an annularly closed channel (or closed ring-shaped channel) between the first port and the second port is established, and the first channel is connected with the first port and the second channel is connected with the second port.

According to the present disclosure, by forming one or more channels with an annularly closed (or closed ring-shaped) channel structure in a valve body of a fluid valve, it may be avoided that a fluid (i.e. liquid and/or gas, optionally comprising solid components) which flows between two or more connection ports (i.e. fluidic terminals) of the channel remains in regions which are fluidically decoupled or only weakly coupled to the flow (such as blind holes of the fluid valve), in which the fluid is conveyed with a strongly reduced velocity or even stops.

By ensuring a continuous rinsing of all portions of the channel which is formed in an annularly closed (or closed ring-shaped) manner, it may thus be avoided that previous sample fluid and/or solvent fluid in connection-free ends of the channel remains unmoved by the fluid flow. Such previous fluid which does not correspond anymore or does not necessarily correspond anymore to a current target-composition of the fluid which flows between the terminal ports, may lead to an undesired carryover of fluid and thus to a disturbance of a fluidic process (for example a sample separation process). When the fluid is a sample liquid, it may be a sample which was separated in a previous sample separation method, for example, which contaminates another sample which is currently to be separated. In the case of a solvent composition, for example in the course of a gradient run of a liquid-chromatographical sample separation, a current solvent composition may not be in accordance with an actually desired solvent composition anymore, but may differ from it. Both lead to a deterioration of the separation performance. By forming the channel structures in an annularly closed manner, and thus keeping them free from non-rinsed regions, it may be ensured that at each point in time, the entire channel is flowed through or rinsed, whereby dead corner regions are avoided.

Therefore, in the fluidic blind-ends of a fluid valve channel, conventionally fluid from a previous processing cycle may remain (for example fluidic sample, solvent, etc.), or a part of such a fluid may diffuse up to such a blind-end in the fluidic operation. In this case, during a long period of time, in a such non-rinsed corner region, fluid may remain and may slowly mix into the flowing fluid. In a chromatographic application, this may lead to an undesired peak broadening or even the formation of artificial peaks. A corresponding "tailing" deteriorates the chromatographic separation results. This effect may be avoided by one or more annularly closed channels (or closed ring-shaped channels) according to the present disclosure.

In the following, further embodiments of the fluid valve, the sample separation device, and the method are described.

For example, the fluid valve may be configured as a sample injection valve, as a modulation valve for a two-dimensional liquid chromatography, as a separation column selection valve or as a solvent composition selection valve. However, many other fluidic configurations of the fluid valve according to the present disclosure are also possible.

According to an embodiment, the first valve body and the second valve body may be rotationally turnable relative to each other. In such an embodiment, the first valve body may be rotated with respect to the second valve body, to switch between different fluidic coupling states and/or decoupling states. Since at a rotary fluid valve, by an adjustment of different angle states, many switching states are possible, the performance of a rotary operated switching valve is especially high. In particular, in such a configuration, the first valve body which comprises the terminal ports may be configured as the stator, which is in particular advantageously, when component parts, such as capillaries, a sample detector, a sample injector, a pump, or a separation column are connected to the respective terminal ports, since, by rotating the valve body, the corresponding component parts do not have to be moved. In a corresponding manner, advantageously the second valve body may be configured with the channels as the rotor which may be moved by a user or in a machine-controlled manner, whereas the valve body which is configured as the stator may rest in a stationary manner.

According to an embodiment, the at least one channel may be formed as a groove in a surface of the valve body, as a lumen which extends in the interior of the valve body, and/or as multiple channel portions which extend in different planes of the second valve body and which are connected with each other. In this context, a surface indentation which is introduced in a surface of the second valve body which is elongated, i.e. comprises a larger length than depth or width, is denoted as a groove. By merely forming a surface indentation, which is possible with a low effort, arbitrarily shaped annular channels may thus be formed, for example by drilling, milling, etc. However, alternatively or additionally, the channel may be configured at least in portions as a lumen or liquid conduit which is fully circumferentially integrated in the second valve body, which is advantageous in view of the sealing requirement between both valve bodies. Alternatively or additionally, it is also possible to arrange different channel portions in different distances from the surface of the second valve body which is adjoining the first valve body, and to thereby form complex three-dimensional channel structures. Furthermore, it is possible that also at the first valve body, one or more channels are formed and/or at the second valve body, one or more terminal ports are formed.

According to an embodiment, an extension direction of the plurality of terminal ports through the first valve body may be substantially perpendicular (or angled, i.e. with an acute angle which is different from 90°) to an extension plane of the at least one channel of the second valve body. Descriptively, the component parts are fluidically connected to the terminal ports through capillary pieces which are attached to the terminal ports, or directly, wherein the terminal ports extend perpendicular to a boundary surface between the first valve body and the second valve body. In contrast, the annular channels may extend in this connection plane or in parallel to it. Thereby, at the boundary positions, a fluid redirecting is caused, which changes the motion direction of the fluid to be transported and which redirects the fluid from a motion direction which extends perpendicular to the valve bodies to the annular flow. The turbulences which are generated at the boundary surface promote the complete rinsing of the annular channel.

The flows through the fluid valve according to an exemplary embodiment may be lower than 100 ml/min, in particular lower than 5 ml/min, further in particular lower than 50 µl/min. The configurations of exemplary embodiments become especially apparent in case of low flows, low sample amounts, peaks which are arranged close to each other and/or short retention times of a chromatographic measurement. The smaller the fluidic dimensions, the stronger non-rinsed channel portions may negatively influence the fluidic processing performance.

According to an embodiment, the fluid can be guided between the terminal ports which are fluidically coupled with the at least in portions annularly closed channel (or closed ring-shaped channel), so that at least two separated (respectively parallel, wherein parallel is not to be understood in the sense of a fluidic decoupling and not necessarily in the geometrical sense) fluid streams between these terminal ports result through the at least one annularly closed channel. Generating multiple (two, three, four or a higher number) fluidic flows which are parallel to each other through different annular portions of the closed annular channel can be seen as an especially efficient method to avoid or to suppress standing fluid regions in the channel structures. The parallel flows through such annular structures may be performed during the normal operation of the fluid valve and/or the sample separation device (i.e. during a separation process) or in a separate rinsing mode for rinsing the annularly closed channels.

According to an embodiment, subportions of the at least one annularly closed channel (or closed ring-shaped channel) which are assigned to the single separated or parallel fluid streams may be configured so that different flow times of the fluid streams in the subportions are at least partially compensated. Such different flow times may result from different lengths of the subportions. In particular, for at least partially balancing such different flow times, the fluidic resistance of the single subpaths may be adjusted (in particular differently adjusted), so that the separated flows are combined again at the correct position at a combination point (in particular so that fluid portions which are separated at a branching point are reunited at a combination point, without a mixing of different fluid portions occurring). For example, this may be performed by adjusting the cross-section area, the length, the flow resistance and other geometric and physical properties of the subportions.

According to an embodiment, the sample separation device may be adapted as a microfluidic measuring device, a liquid chromatography device or HPLC. Thus, in particular, the sample separation device may be configured as a HPLC-device (high-performance liquid chromatography), a life science device, or an SFC-device (supercritical fluid chromatography). However, other applications are possible.

According to an embodiment, the sample separation device may be configured in a pressure tight manner, for an operation at a pressure of up to approximately 100 bar, in particular for an operation at a pressure of up to approximately 500 bar, further in particular for an operation at a pressure of up to approximately 2000 bar.

According to an embodiment, the sample separation device may comprise a sample injector for an injection of the fluidic sample in a mobile phase in a separation path between a pump for moving the mobile phase and a separation column for separating different fractions of the sample in the mobile phase. By moving the first valve body and the second valve body relative to each other, the fluid valve may be switchable, to inject the sample from the sample injector in the separation path. Such a fluid valve between a sample injector on the one hand and a separation path between mobile phase pump and a sample separation element on the other hand comprises a plurality of channels and terminal ports which on the one hand have to handle the sample fluid, on the other hand have to handle the mobile phase (such as a constant or variable solvent composition). This is performed with respect to the sample liquid in a low-pressure path, whereas in the region of the pumped mobile phase, a higher pressure prevails. Such pressure differences conventionally increase the risk of pressing the fluid in blind holes of coupling channels, which is suppressed or eliminated by the provision of at least in portions completely closed annular channels (or closed ring-shaped channels) according to the present disclosure.

According to an embodiment, the sample separation device may comprise a separation column for separating different fractions of the injected fluid sample. Such a separation column may be filled with an adsorption medium, for example porous beads made of silica gel or active carbon. By a chemical interaction with these porous beads, the fluidic sample may then be temporarily immobilized or absorbed at the separation column. For example, by an adjustment of a gradient of a solvent composition, the single fractions may be individually released or desorbed by the adsorption medium and may be subsequently detected.

According to an embodiment, the sample separation device may comprise a pump for conveying the injected fluid sample commonly with a mobile phase. The mobile phase may be a solvent composition which may be constant over time or which may adjustably change and which, after inserting the fluid sample through the injection valve in the sample separation path, is mixed with the fluid sample. The mixture of the mobile phase and the fluid sample may then be pumped by a high-pressure pump through the chromatographic separation path. Hence, the sample separation device may comprise one or more pumps for conveying the injected fluid sample commonly with a mobile phase through at least a part of the sample separation device. For example, such a pump may be configured to pump the mobile phase with a high pressure, for example some 100 bar up to 1000 bar and more, through the system.

According to an embodiment, the sample separation device may comprise a sample detector for detecting the separated sample components of the fluid sample. Such a sample detector may be based on a detection principle which detects electromagnetic radiation (for example in the UV-range or in the visible range), which originates from certain sample components of the fluid sample.

Alternatively or additionally, the measuring device may comprise a fractionator for fractionizing the separated sample components. Such a fractionator may lead the different sample components in different sample containers, for example. However, the analyzed fluid sample may also be supplied to a waste container.

BRIEF DESCRIPTION OF DRAWINGS

Other objects and many of the accompanying advantages of embodiments of the present disclosure become easily apparent and better understood with reference to the following detailed description of embodiments together with the accompanying drawings. Features which are essentially or functionally the same or similar, are provided with the same reference signs.

FIG. 4A shows a fluid valve according to another exemplary embodiment of the present disclosure.

FIG. 4B shows the fluid valve illustrated in FIG. 4A in a different switching state.

FIG. 4C shows a fluid valve according to another exemplary embodiment of the present disclosure.

FIG. 4D shows the fluid valve illustrated in FIG. 4C in a different switching state.

Figure 1:
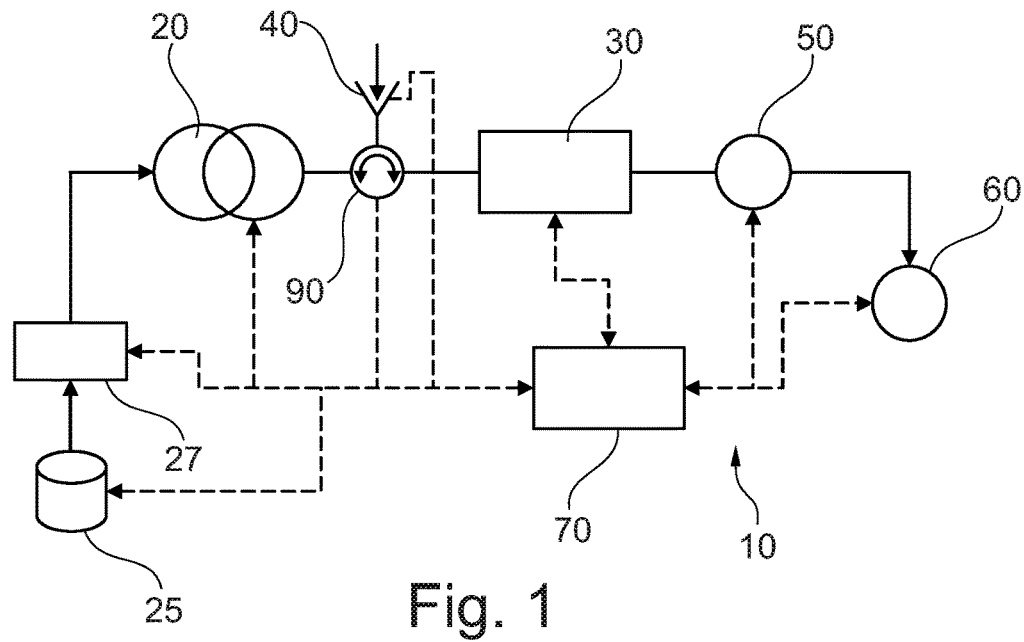
FIG. 1 shows a HPLC measuring device according to an exemplary embodiment of the present disclosure.

The illustrations in the drawings are schematic.

DETAILED DESCRIPTION

Before exemplary embodiments of the present disclosure are described in more detail with reference to the drawing figures, generally some basic considerations of the present invention shall be described, based on which exemplary embodiments of the present disclosure have been developed.

In a liquid separation device, flow paths are defined by small dimensioned or small volume geometries which are implemented using channels, terminal ports and capillaries. These form the connection elements between the functional elements or component parts, such as pumps, injectors, columns, and detectors. By the reduction of the entire volumes in the sample separation, the sensitivity of a sample separation device can be increased. However, thereby, also side effects as a consequence of thin or narrow fluid structures become more pronounced. Therefore, in modern HPLC, in particular UHPLC, it is important to suppress dispersion effects (which may lead to peak broadening) and to keep a carryover of fluid as low as possible (for preventing artifacts in the chromatogram by residues of a previously analyzed sample in the separation path). Separation techniques execute a sample injection by a, in particular rotary, fluid valve. As a fluid valve, a switchable valve with channels (for example grooves in a valve body) which establish a fluid connection and associated terminal ports (in another valve body which is cooperating with it) may be utilized. Switching the channels may influence the connection states of the terminal ports. Frequently, it is necessary to maintain certain fluidic connections not only in a single valve position, but in an extended angle position range of the valve rotor. For example, this may be necessary, when during switching from an initial position to an end position, the order is of importance, in which the single fluid connections are established, or when at least two valve positions are defined in which the state of a first connection is different (closed or opened), while a second connection shall persist without interruption. Conventionally, this task is realized by implementing elongated channels (which may also be denoted as grooves) in the parts of such a switching element, for example in the rotor and/or in the stator of a rotary fluid valve, so that the channels bypass the required angle range for the connected state. The disadvantage of such a conventional approach is that such channels may have non-rinsed ends, which provide a stagnation zone for the fluid.

According to an exemplary embodiment, a fluid valve for switching between different flow paths without non-rinsed channel ends and/or with the possibility of providing less channel ends is provided. In particular, a geometry is enabled, by which blind-ends in a flow path can be avoided. According to an exemplary embodiment, a transition between channels and terminal ports of fluid valves is accomplished, by which non-rinsed channel portions can be avoided. In order to avoid channel portions with fluidic stagnation zones at a transition between terminal ports and the channel, according to an exemplary embodiment, a channel (for example a groove in a valve body) with a potentially non-rinsed end is re-formed to or supplemented with a closed annular (or closed ring-shaped, or closed-loop) structure (i.e. whose conventionally free ends may be connected or short-circuited with each other, according to the present disclosure). Thereby, the points which are to be fluidically connected, may be connected by at least two parallel or separated flow paths which respectively bypass the distance between the terminal ports. Therefore, the flow is split, so that separate partial flows together rinse the entire groove, so that in the connected state, no or only less stagnation zones occur.

FIG. 1 shows the principal structure of a HPLC-system 10 as an example for a sample separation device, as it may used for a liquid chromatography, for example. A pump 20 drives a mobile phase which is provided by a solvent container 25 and may be degassed by a degasser 27 through a separation device 30 (for example a chromatographic column) which contains a stationary phase. A sample insertion unit 40 (also denoted as sample injector) is arranged between the pump 20 and the separation device 30, to introduce a fluidic sample in the mobile phase by a fluid valve 90 according to an exemplary embodiment of the present disclosure. The stationary phase of the separation device 30 is provided for separating sample components of the sample liquid. A detector 50 detects the separated sample components of the sample, and a fractionizing device 60 may be provided to discharge the separated sample components of the sample liquid, for example in a container or a drain which are provided for this purpose. A control unit 70 controls the components of the HPLC-system 10.

While a liquid path between the pump 20 and the separation device 30 is typically under high pressure, the sample liquid is introduced under normal pressure at first in a region which is separated from the liquid path, a so-called sample loop, of the sample insertion unit 40 which then in turn introduces the sample liquid in the liquid path which is under high pressure. When connecting the sample liquid which is at first under normal pressure in the sample loop in the liquid path which is under high pressure, the content of the sample loop is abruptly (typically in the range of milliseconds) brought to the system pressure of the HPLC-system 10. The fluid valve 90 is configured to introduce a fluidic sample from the sample injector/the sample insertion unit 40 into the analytical path between the pump 20 and the separation column 30.

Figure 2:
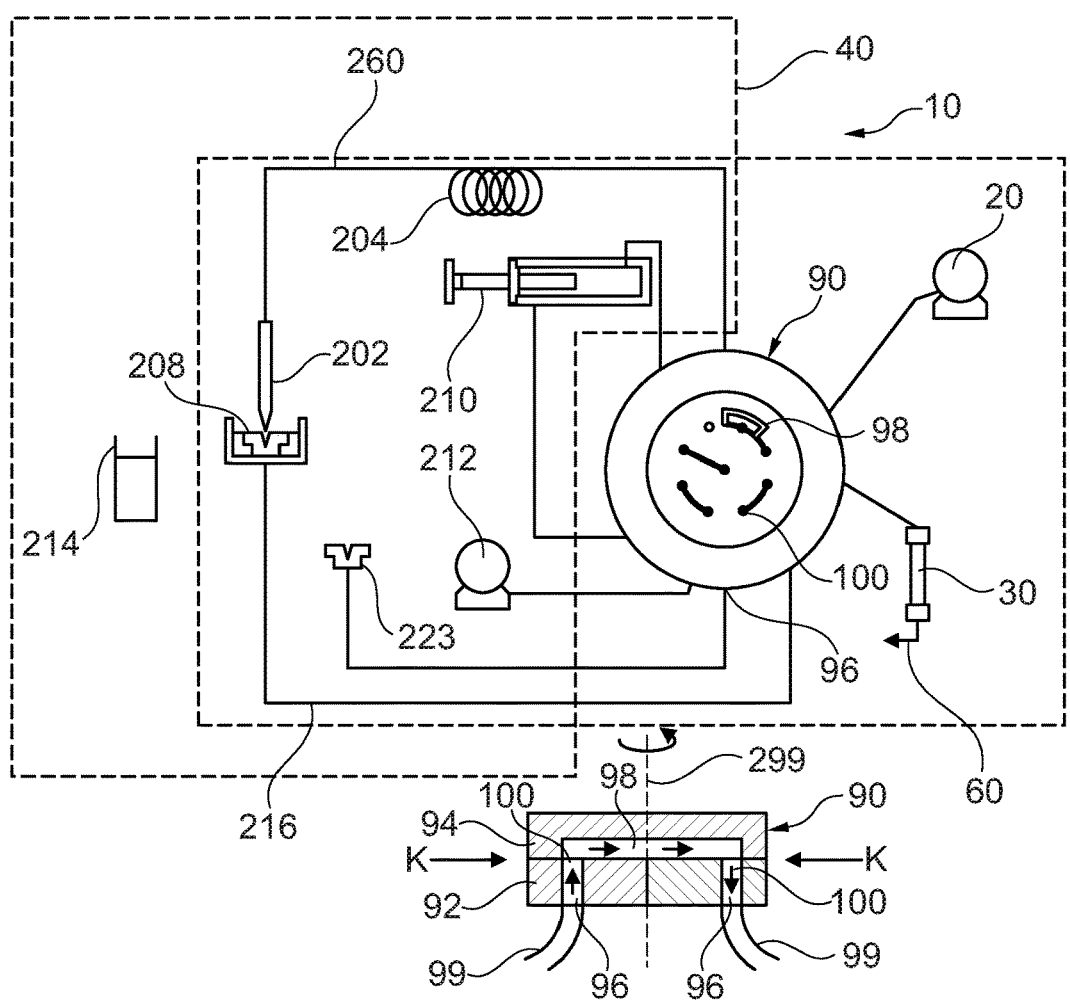
FIG. 2 shows a sample separation device with a sample injection device with a sample injection valve according to an exemplary embodiment of the present disclosure.

FIG. 2 illustrates the sample injector 40 of the sample separation system 10 according to FIG. 1 for separating sample components of a fluidic sample in a mobile phase according to an exemplary embodiment of the present disclosure in more detail.

The sample injector 40 is fluidically coupled via the switchable fluid valve 90-which is only schematically illustrated in FIG. 2-with the pump 20, and with the separation device 30 and the fractionator 60 that are connected downstream. The sample injector 40 contains a sample loop 204 which is in fluid communication with the fluid valve 90. The sample loop 204 serves for temporarily receiving a fluidic sample to be sucked out of a sample container 214 (for example a vial or a microtiter plate). A schematically illustrated dosing or metering pump 210 is in fluid communication with the sample loop 204 and is configured for sucking a dosed or metered amount of the fluidic sample in a needle 202 which is coupled via a needle capillary 260 with the sample loop 204.

The switchable fluid valve 90 comprises two valve elements or valve bodies 92, 94 which are shown in a cross-sectional view as a detail in FIG. 2 and which are rotatable relative to each other. By rotating at least one of the valve bodies 92, 94 relative to the other around a rotation axis 299, a plurality of terminal ports 96 and channels 98 which are formed in the valve bodies 92, 94, can be selectively brought into fluid communication with each other, or a fluid communication may thereby be prevented. Since the different terminal ports 96 are coupled with particular ones of the fluidic channels 98 of the fluidic system according to FIG. 2, switching the fluid valve 90 leads to an operation of the fluidic system 10 in different fluid communication configurations.

In the illustration of FIG. 2, the fluid valve 90 is only schematically shown, i.e. in particular the shown terminal ports 96, ports 100, and channel or channels 98 are not fluidically coupled with each other and/or are illustrated in a switching position which is adapted to a sample injection. Special embodiments of the fluid valve 90 are illustrated by FIGS. 3 to 6 in more detail.

A fluid communication between the high-pressure pump 20 and the separation column or the separation device 30 may be caused by an associated switching state of the fluid valve 90. In such a fluidic path, for example a high pressure of 100 MPa may be present, which may be generated by the high-pressure pump 20. In contrast, the pressure in the sample loop 204 may be lower than 0.1 MPa, when a sample is sucked in the sample loop 204. When the sample which is introduced in the sample loop 204 is loaded on the separation device 30, also the pressure in the sample loop 204 is high, for example 100 MPa.

To load the sample, the needle 202 can be extended out of a correspondingly designed seat 208, so that the needle 202 can be immersed in the sample container 214 which contains a fluidic sample which shall be received in the needle 202. When the dosing or metering pump 210, when the needle 202 is immersed in the sample container 214, has sucked the liquid in the needle 202 and an adjoining region of the sample loop 204 by retracting a piston, the needle 202 is retracted back in the seat 208, the fluid valve 90 is correspondingly switched, and thus the sucked sample is injected through a seat capillary 216 and the fluid valve 90 in the path between the pump and the separation device 30. Moreover, FIG. 2 shows an optional rinsing pump 212 and an optional rinsing seat 223.

As already mentioned above, also the structure of the fluid valve 90 according to an exemplary embodiment is schematically shown in FIG. 2. FIG. 2 shows the fluid valve 90 in the state switched in the sample injector 40 in a plan view, and moreover in a cross-sectional view.

The fluid valve 90 serves as an injector valve for injecting a fluidic sample from the sample injector 40 into a separation path between the pump 20 and the chromatographic separation column as separation device 30. The fluid valve 90 comprises a first disk-shaped valve body 92, which contains nine terminal ports 96 in the shown embodiment. These are connected to the single component parts 20, 30, 40 of the sample separation device 10, as shown in FIG. 2. The first valve body 92 is configured as the stator of the fluid valve 90 which is configured as a rotary valve and adjoins two capillaries 99 in a fluid tight manner, which are fluidically connected with the single component parts 20, 30, 40, etc.

The second disk-shaped valve body 94 is configured as a rotatable rotor of the fluid valve 90 and comprises a linear radial channel 98 and three annularly closed channels (or closed ring-shaped channels) 98 in the form of grooves which are formed as surrounding indentations in a planar surface of the disk-shaped second valve body 94 in this case. When the channels 98 are arranged between the first valve body 92 and the second valve body 94 which is coupled with it in a fluid tight manner, an annularly closed (or closed ring-shaped) fluid conduit is formed in between, through which a fluidic sample and/or a mobile phase can be conducted.

The rotatably mounted second valve body 94 may be rotated relative to the statically mounted first valve body 92 around the rotation axis 299, to establish different fluidic coupling states and/or decoupling states between the single terminal ports 96, promoted by the annularly closed channel structures 98 which are arranged respectively in between or in a bypassing manner.

The first valve body 92 and the second valve body 94 respectively comprise opposing surfaces which commonly form an effective surface and are schematically illustrated in the cross-sectional view of the fluid valve 90 which is shown below in FIG. 2 as a coupling surface K. A plurality of ports 100 which are respectively fluidically connected with at least one of the terminal ports 96 lead to this coupling surface K.

The cross-sectional view of the fluid valve 90 in FIG. 2 illustrates an embodiment in which a flow direction of the fluid through the terminal ports 96 is performed in a vertical direction, whereas in the cross-sectional view, a flow direction of the fluid is performed through the annular channel 98 in a horizontal plane. This enables a reduction of dead volumes and/or a proper performability. Other configurations are correspondingly possible.

Figure 3:
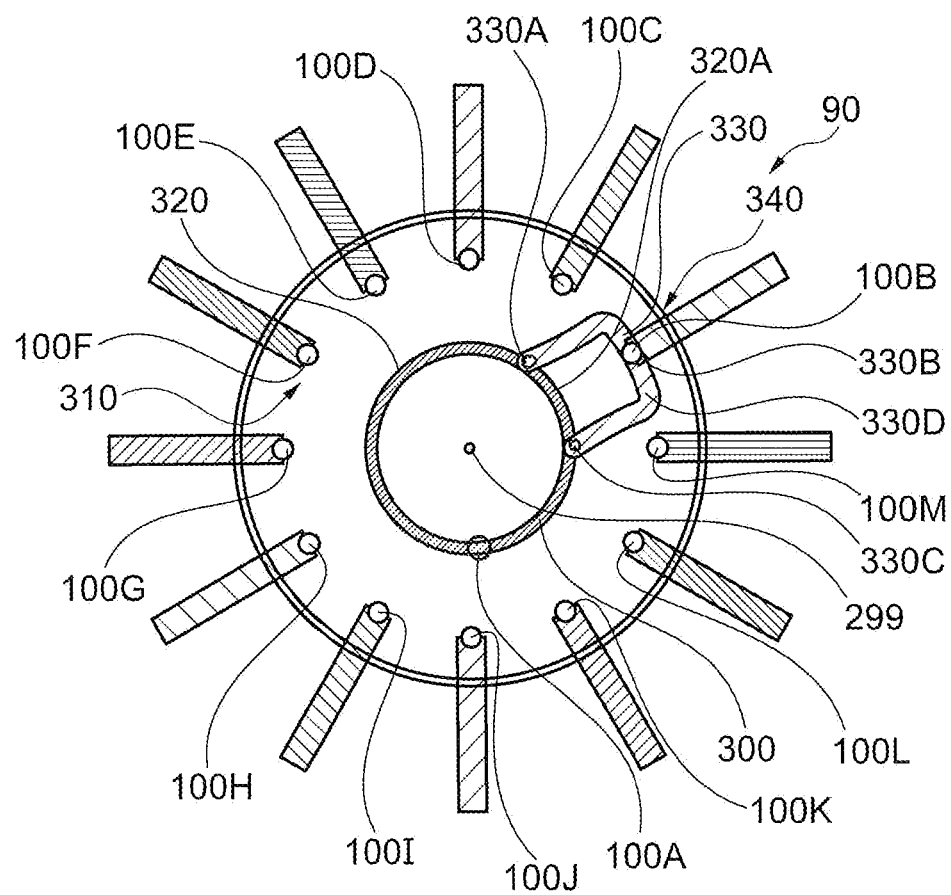
FIG. 3 shows a fluid valve according to an exemplary embodiment of the present disclosure.

FIG. 3 exemplarily shows a first embodiment of a fluid valve 90. The view is schematic in a plan view on the coupling surface K between the first valve body 92 (e.g., a stator) and the second valve body 94 (e.g., a rotor) which is shown in FIG. 2. In the here selected illustration, only the elements are illustrated which act into this coupling surface K. The plurality of external terminal ports 96 cannot be taken from this view.

The fluid valve 90 comprises a plurality of ports 100 which may be respectively connected with the external terminal ports 96 (here not illustrated). A first port 100A is located on a first circular path 300 around the rotation axis 299 which is arranged in the center and is schematically illustrated as a point. A second port 100B is located with further ports 100C to 100M on a second circular path 310 around the rotation axis 299. For the sake of clarity, the second circular path 310 is not explicitly illustrated, but results from the overview of the ports 100B to 100M.

The fluid valve 90 further comprises a first channel 320 and a second channel 330. The channels 320 and 330 correspond to the channels 98 which are illustrated in FIG. 2, but are denoted with different reference signs in the following for the sake of clarity and for a better understanding.

The first channel 320 is an annular channel along the first circular path 300 and may be configured as an annular groove or another indentation in the surface of the first valve body 92 which is acting towards the coupling surface K.

In the embodiment according to FIG. 3, the second channel 330 is illustrated with a U-shape which, respectively with the endpoints of its legs, lies on the first circular path 300. The second channel 330 forms a first (fluidic) coupling point 330A on the first circular path 300 and thus with the first channel 320, a second (fluidic) coupling point 330B on the second circular path 310 and thus with the port 100B, and a third (fluidic) coupling point 330C which is in turn on the first circular path 300 and thus with the first channel 320.

In the embodiment is illustrated in FIG. 3, the region of the second channel 330 which shall fluidically couple with the second coupling point 330B is formed as a circle segment 330D which is located on the second circular path 310. In the embodiment of FIG. 3, which is illustrated here, the length of the circle segment 300D along the second circular path 310 is selected to be the distance between two neighboring ports 100, so that the circle segment 300D at the same time can override or overlap two neighboring ports 100 and can fluidically couple with them. Depending on the embodiment and the application, the length of the circle segment 300D may also be selected to be smaller than the distance between two neighboring ports 100, so that always only one port 100 may fluidically couple with the circle segment 300D and therefore fluidically couple with the second channel 300. Alternatively, the length of the circle segment 300D may also be selected such that more than two neighboring ports can be fluidically coupled with each other by the circle segment 300D.

The second channel 330 may be formed by a groove or another indentation in the surface of the second valve body 94 which is acting towards the coupling surface K.

By rotating the first valve body 92 with respect to the second valve body 94, i.e., by rotating the rotor 94 with respect to the stator 92, for example, a fluidic coupling between the first port 100A (on the first circular path 300)

and either a port or two neighboring ports of the plurality of ports 100B to 100M on the second circular path can be established.

In the example is shown in FIG. 3, a fluidic coupling between the first port 100A and the second port 100B is performed. This is performed by the fluidic coupling of the port 100A with the first channel 320, to which in turn the second channel 330 is fluidically coupled via the first coupling point 330A and the third coupling point 330C. Finally, the second port 100B fluidically couples with the second channel 330.

As can be taken from FIG. 3, the second channel 330, together with a segment 320A (between the first coupling point 330A and the third coupling point 330C) of the first channel 320, forms an annularly closed channel (or closed ring-shaped channel, or closed-loop channel) 340. In contrast to the first channel 320 which is here configured as an annular channel which is exclusively more pronounced either in the first valve body 92 or in the second valve body 94, the annularly closed channel 340 is formed by at least one channel segment 320A which is located in the first valve body 92, and at least one channel segment 330 which is located in the second valve body 94. In other words, the annularly closed channel 340 is formed by a channel structure 320A of the stator 92 and a channel structure 330 of the rotor 94. This cooperation of the channel structures both of the stator and of the rotor to an annularly closed channel 340 enables (with respect to an annular channel which is located exclusively in the rotor or the stator) an additional degree of freedom in the design of the fluidic connections and in particular in a design of a rinsability of such fluidic connections.

It is clear that the mentioned coupling points respectively do not have a fixed position or a defined extension, but they are representative for a fluidic coupling which results from a geometrical coupling of the respective channels and ports to each other. Correspondingly, also the respective geometrical coupling defines the spatial extension of a respective coupling point. In the embodiment which is illustrated in FIG. 3, the first coupling point 330A results from the geometrical combination of the first channel 320 and an end of the second channel 330. Correspondingly, also the third coupling point 330C results from the geometrical combination of the first channel 320 with the other end of the second channel 330. The second coupling point 330B in turn results from the geometrical combination of the segment of the second channel 330 which is located on the second circular path with the second port 100B. While the coupling points which are illustrated in FIG. 3 are substantially point-shaped with an extension corresponding to the respective channel width, in the following, other embodiments are shown, in which the coupling points may also be configured as planar regions, e.g., by channel structures which overlap each other.

By rotating the second valve body 94 with respect to the first valve body 92, other switching states of the fluid valve 90 may now be achieved. For example, by rotating in a clockwise manner or in an anticlockwise manner, the first port 100A can be individually connected with any other one of the ports 100B to 100M.

Furthermore, in the embodiment which is illustrated in FIG. 3, the segment 330D of the second channel 330 which is located on the second circular path 310 is configured such that, by the segment 330D, also two neighboring ports of the ports 100B to 100M may be connected with each other and at the same time with the first port 100A (not specifically illustrated in FIG. 3). Starting from the position which is illustrated in FIG. 3, in which the second channel 330 fluidically couples with the second port 100B, when rotating the second valve body 94 (for example in an counterclockwise manner), the segment 330D of the second channel 330 which is located on the second circular path 310 will reach the port 100C at a point in time and will thus establish a fluidic coupling to the port 100C, i.e. the port 100C then constitutes a fourth coupling point.

When the length of the segment 330D is selected such that, when reaching the port 100C, also a coupling with the second port 100B still exists, at this point in time (and as long as the length of the segment 330D is sufficient to override or overlap and to fluidically contact both ports 100B and 100C) both ports 100B and 100C are fluidically coupled with the segment 330D and therefore with the second channel 330. For example, this may be performed in the sense of a "make before break" coupling, i.e., for example at a transition of a fluidic coupling of the second channel 330 of the second port 100B to the neighboring port 100C in a transition period, both ports 100B and 100C are coupled with the second channel 330 at the same time, so that in this transition period, the fluidic coupling with the port 100C is already established, while the fluidic coupling with the port 100B is still maintained. Vice versa, by such a configuration, it may be avoided that at a point in time, the second channel 330 is fluidically in connection with none of the ports 100 and therefore a fluidic closure may result.

The FIGS. 4A to 4D represent two further embodiments of a fluid valve 90, wherein FIGS. 4A and 4B, as well as FIGS. 4C and 4D, respectively show the same embodiment, but in different switching states.

In the embodiment of FIGS. 4A and 4B, the fluid valve 90 comprises a third channel 400 besides the first channel 320 and the second channel 330. Similarly as shown in FIG. 3, the second channel 330 fluidically couples, by the first coupling point 330A and the second coupling point 330B, which respectively are located on the first circular path 300, to the first channel 320 which is also located on the first circular path 300. Besides the first port 100A which is located on the first circular path 300, the fluid valve 90 comprises further ports 100B to 100G which are located on the second circular path 310, and a central port 100H in the rotation axis 299, and ports 100I to 100N in a third circular path. Here, the third circular path shall be located between the first circular path 300 and the rotation axis 299.

The third channel 400 shall be located in the same valve body as the second channel 330, i.e., either in the first valve body 92 or in the second valve body 94, so that the third channel 400 together with the second channel 330 is rotationally movable around the rotation axis 299 with respect to the ports 100 and the first channel 320.

The third channel 400 is fixedly fluidically coupled with the central port 100H and further comprises two radial channel segments 400A and 400B and a channel segment 400C which is located on the third circular path, wherein the channel segments 400A to 400C constitute an annularly closed channel (or closed ring-shaped channel). The channel segment 400C enables one or two neighboring ports of the ports 100I to 100N, which are located on the third circular path, to fluidically couple.

Corresponding to the embodiments which are shown in FIG. 3, also in the embodiment of FIGS. 4A to 4B, the circle segment 330D of the second channel 330 which is located on the second circular path 310 is so dimensioned, that either one or two neighboring ports of the ports 100B to 100G which are located on the second circular path can be fluidically coupled by it. FIG. 4A shows a switching state, in which the second channel 330 fluidically couples the ports 100B and 100C with each other, while FIG. 4B illustrates a switching state, in which the second channel 330 couples with the port 100C.

In the embodiment which is shown in FIGS. 4A and 4B, the second channel 330 and the third channel 400 are positioned with respect to each other, such that both fluidically couple either with one or with two ports 100. However, by a corresponding angle orientation with respect to each other, also other coupling modes may be achieved, i.e., that one of the channels 330 and 400 fluidically couples with a port 100, while the other of the channels 330 and 400 couples with two ports 100, for example.

FIGS. 4C and 4D show an embodiment corresponding to FIGS. 4A and 4B, wherein the circle segment 330D of the second channel 330 is longer than the distance of neighboring ports 100 on the second circular path 310. Depending on the selected additional length, three or more ports may be connected with each other, e.g. in a transition region.

FIGS. 5A to 5D illustrate a further embodiment of the fluid valve 90 in different switching positions, in which the second valve body 94 is rotated with respect to the first valve body 92 around the rotation axis 299.

The first channel 320 is not a closed annular (or closed ring-shaped) channel as in the embodiments of FIGS. 3 and 4, but comprises a first channel segment 320A and a second channel segment 320B which are respectively located on or extend on the first circular path 300.

In the first circular path 300, the first port 100A and a port 100F are located, wherein the first port 100A is located on the first channel segment 320A, and the port 100F is located on the second channel segment 320B. In the second circular path 310, the ports 100B to 100E are located.

The ports 100A and 100F may be connected with each other by a suitable fluidic connection 500, as it is schematically illustrated in FIG. 5. For example, the connection 500 may be implemented by a corresponding channel structure, e.g., within the first valve body 92, or by an external access of corresponding terminal ports 96.

For the sake of clarity, the second channel 330 is illustrated with reference sign 530 in FIG. 5. The second channel 530 comprises five segments 530A to 530E which are connected with each other. A first segment 530A extends along the first circular path 300. A second segment 530B extends radially between the first circular path 300 and the second circular path 310. A third segment 530C extends along the second circular path 310. A fourth segment 530D extends radially between the second circular path 310 and the first circular path 300. A fifth segment 530E extends along the first circular path 300.

As can be taken from FIGS. 5, the fluid valve 90 may be operated such that the first segment 530A at least partially overlaps with the first channel segment 320A, and the fifth segment 530E at least partially overlaps with the second channel segment 320B. This is explained in more detail in the following.

Figure 5A:
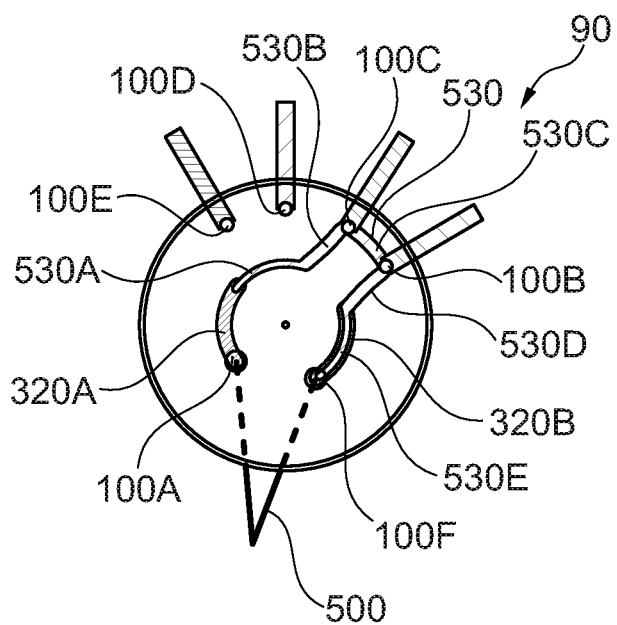
FIG. 5A shows a fluid valve according to another exemplary embodiment of the present disclosure.

In the switching state which is illustrated in FIG. 5A, the first port 100A is connected with the port 100 via the first channel segment 320A, and the first segment 530A, which is slightly overlapping with it, and the second segment 530B. Correspondingly, the port 100F is connected with the port 100B via the second channel segment 320B, and the fifth segment 530E which is slightly overlapping with it, and the fourth segment 530D. At the same time, the ports 100F and 100B are connected with each other via the third segment 530C.

When a fluidic coupling between the ports 100A and 100F is constituted via the connection 500, also by this measure, an annularly closed (or closed ring-shaped) fluidic coupling between the ports 100A, 100C, 100B and 100F can be achieved. This enables an improved rinsability of these fluidic connections.

Figure 5B:
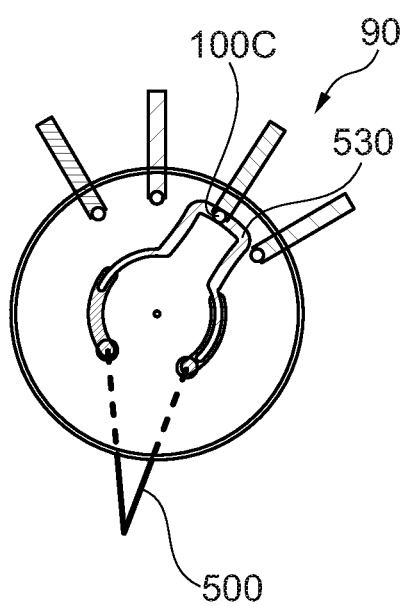
FIG. 5B shows the fluid valve illustrated in FIG. 5A in a different switching state.

In the switching state which is illustrated in FIG. 5B, the second channel 530 is slightly rotated in a counterclockwise manner with respect to the switching state in FIG. 5A, so that only the port 100C is connected with the ports 100A and 100F.

Figure 5C:
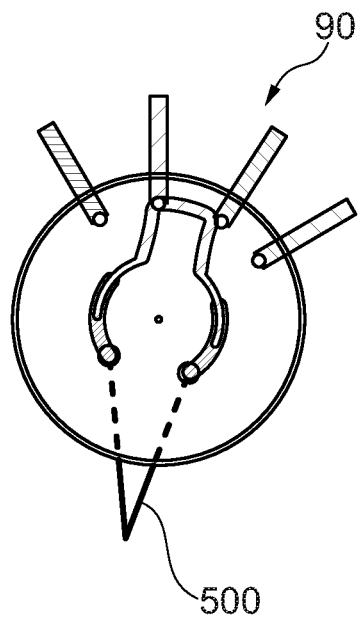
FIG. 5C shows the fluid valve illustrated in FIG. 5A in a different switching state.

In FIG. 5C, the second channel 530 is slightly further rotated in a counterclockwise manner again, so that the ports 100A and 100F are now connected with the ports 100C and 100D.

Figure 5D:
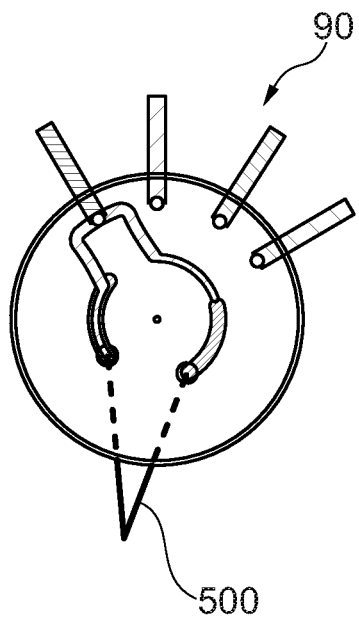
FIG. 5D shows the fluid valve illustrated in FIG. 5A in a different switching state.

In FIG. 5D, the second channel 530 is slightly further rotated in a counterclockwise manner again, so that the ports 100A and 100F are only coupled with the port 100E now.

Figure 6:
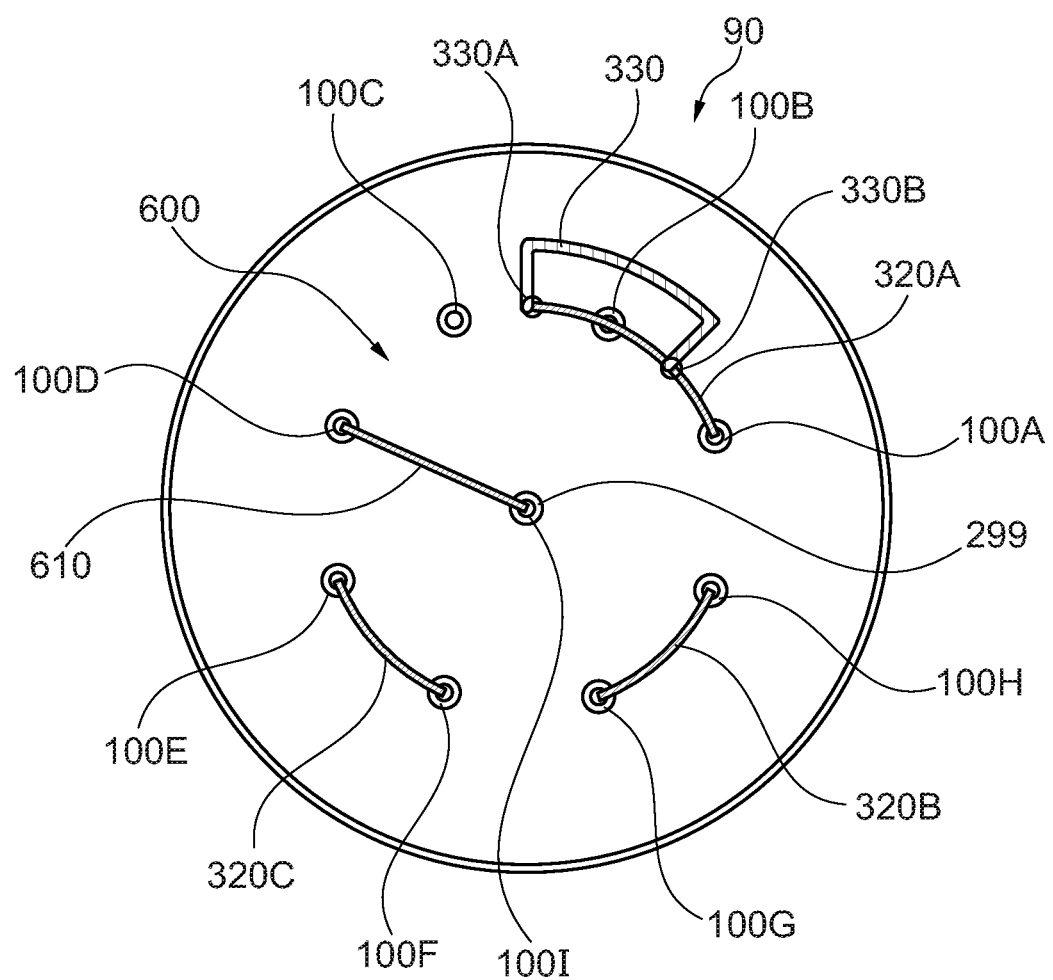
FIG. 6 shows a fluid valve according to another exemplary embodiment of the present disclosure.

FIG. 6 shows a further embodiment of a fluid valve 90. The first channel 320 comprises three segments 320A to 320C which are respectively located on a circular path 600 around the rotation axis 299. In the embodiment according to FIG. 6, the first and the second circular paths 300 and 310 which are shown in the previous examples, coincide in this circular path 600, on which a plurality of ports 100 are located, namely the first port 100A, the second port 100B, and the ports 100C to 100H. Furthermore, the port 100D is connected via a radial channel 610 with a central port 100I.

The second channel 330 is constructed similarly as shown in the embodiment according to FIG. 3, wherein the first coupling point 330A and the second coupling point 330B are located on the circular path 600.

In the exemplary switching position of the fluid valve 90 which is illustrated in FIG. 6, the ports 100A and 100B are fluidically coupled with each other via the segment 320A, wherein further the second channel 330, through the coupling points 330A and 330B which are located on the segment 320A, form a closed annular channel (or closed ring-shaped channel) with the portion of the segment 320A which is located between the coupling points 330A and 330B.

Also when the embodiments of the fluid valve 90 which are illustrated in the foregoing are illustrated and explained in view of a sample separation device 10, it is apparent, that the fluid valve 90 can also be used in other applications and fields of applications. Hence, embodiments of the fluid valve 90 according to the present disclosure may also be utilized in other valve applications than for sample injection and sample separation, e.g., in which a good rinseability is required. Also within a sample separation device 10, fluid valves according to the invention may be used at other positions and for other purposes than for a sample injection.

It should be noted that the term "comprising" does not exclude other elements, and the term "a" does not exclude a plurality. Also elements which are described in connection with different embodiments may be combined. It should be further noted, that reference signs in the claims are not to be construed as limiting the scope of protection of the claims.

The invention claimed is:
1. A fluid valve for a sample separation device for separating at least one sample component of a fluidic sample, the fluid valve comprising:
 a plurality of external terminals for fluidically connecting a respective fluidic component part;
 a rotor and a stator, wherein, by rotating the rotor around a rotation axis, different fluidic coupling states and/or decoupling states between fluidic component parts connected to the fluid valve are adjustable;
a plurality of ports respectively fluidically connectable with at least one of the external terminals, wherein a first port of the plurality of ports is located on a first circular path around the rotation axis, and a second port of the plurality of ports is located on a second circular path around the rotation axis;
a first channel formed at least in portions along the first circular path; and
a second channel comprising a first coupling point and a second coupling point, wherein the first coupling point is located on the first circular path and the second coupling point is located on the second circular path, wherein:
the first channel is formed by the stator and the second channel is formed by the rotor, or vice versa;
by rotating the rotor with respect to the stator, the second channel rotates relative to the first channel and the plurality of ports, or vice versa; and
by rotating the rotor with respect to the stator, a fluidic coupling between the first port and the second port can be established, by the first channel being connected with the first port and at least via the first coupling point with the second channel, and by the second channel being connected at least via the second coupling point with the second port.

2. The fluid valve according to the claim 1, comprising at least one of the following features:
the first coupling point comprises a point or region, via which the second channel is fluidically connected with the first channel;
the second coupling point comprises a point or region, via which the second channel is fluidically connected with the second port.

3. The fluid valve according to claim 1, comprising one of the following features:
the second channel comprises a third coupling point located on a third circular path around the rotation axis;
the second channel comprises a third coupling point located on a third circular path around the rotation axis, wherein the third circular path and the first circular path have the same radius around the rotation axis.

4. The fluid valve according to claim 1, wherein the second channel comprises a first portion located on the first circular path, and the first coupling point is in the first portion.

5. The fluid valve according to claim 1, comprising at least one of the following features:
the second channel comprises a first portion located on the first circular path, and a second portion located on the second circular path, wherein the second portion extends at least between two ports of the plurality of ports, which two ports are located on the second circular path;
the second channel comprises a third coupling point located on a third circular path around the rotation axis, a fourth coupling point located on the second circular path, a first portion located on the first circular path, and a second portion extending between the second coupling point and the fourth coupling point, wherein the second coupling point is connected with the second port, and the fourth coupling point is connected with a third port of the plurality of ports, which third port is located on the second circular path;
the second channel comprises a third coupling point located on a third circular path around the rotation axis, a fourth coupling point located on the second circular path, a first portion located on the first circular path, and a second portion extending between the second coupling point and the fourth coupling point, wherein the second coupling point is connected with the second port, the fourth coupling point is connected with a third port located on the second circular path, and the fourth coupling point comprises a point or region via which the second channel is fluidically connected with the third port.

6. The fluid valve according to claim 1, wherein the second channel comprises a third coupling point located on a third circular path around the rotation axis, and comprising at least one of the following features:
the third coupling point comprises a second end of the second channel;
the third coupling point comprises a point or region, via which the second channel is fluidically connected with the first channel;
the third coupling point and the first coupling point coincide;
the third coupling point and the first coupling point overlap each other;
the third coupling point and the first coupling point are located on different positions of the second channel.

7. The fluid valve according to claim 1, wherein the second channel comprises a third coupling point located on a third circular path around the rotation axis, a first portion located on the first circular path, a second portion located on the second circular path, and a third portion located on the third circular path, and wherein the third coupling point is in the third portion.

8. The fluid valve according to claim 1, wherein:
the second channel comprises a third coupling point located on a third circular path around the rotation axis; and
in the fluidic coupling between the first port and the second port the first port is connected with the first channel, the first channel is connected at least via the first coupling point and at least via the third coupling point with the second channel, and the second channel is connected at least via the second coupling point with the second port.

9. The fluid valve according to claim 1, comprising one of the following features:
the fluidic coupling between the first port and the second port comprises a closed ring-shaped channel;
in the fluidic coupling between the first port and the second port, the first port and the second port are connected by a closed ring-shaped channel, wherein the first port is connected with the second port via a first fluidic path and via a second fluidic path of the closed ring-shaped channel.

10. The fluid valve according to claim 1, wherein:
in the fluidic coupling between the first port and the second port, the first port is connected with the second port via a first fluidic path and via a second fluidic path.

11. The fluid valve according to claim 10, wherein:
the first fluidic path comprises a first subregion of the first channel and a first subregion of the second channel;
the first subregion of the first channel extends between the first port and the first coupling point; and
the first subregion of the second channel extends between the first coupling point and the second port.

12. The fluid valve according to claim 10, wherein:
the second channel comprises a third coupling point located on a third circular path around the rotation axis;

the second fluidic path comprises a second subregion of the first channel and a second subregion of the second channel;

the second subregion of the first channel extends between the first port and the third coupling point; and the second subregion of the second channel extends between the third coupling point and the second port.

13. The fluid valve according to claim 1, comprising at least one of the features:

the fluid valve is a shear valve;

the first channel is formed by the stator;

the first channel is formed by an indentation in a surface of the stator that opposes the rotor;

the second channel is formed by the rotor;

the second channel is formed by an indentation in a surface of the rotor that opposes the stator;

the stator comprises the plurality of external terminals;

the stator comprises the plurality of ports;

the stator comprises the plurality of ports respectively as an indentation in a surface of the stator that opposes the rotor;

the stator comprises a plurality of fluidic connections for connecting one or more of the plurality of external terminals respectively with one or more of the plurality of ports.

14. A fluid valve for a sample separation device for separating at least one sample component of a fluidic sample, the fluid valve comprising:

a plurality of external terminals for fluidically connecting a respective fluidic component part;

a rotor and a stator, wherein, by rotating the rotor around a rotation axis, different fluidic coupling states and/or decoupling states between fluidic component parts connected to the fluid valve are adjustable;

a plurality of ports respectively fluidically connectable with at least one of the external terminals, wherein a first port of the plurality of ports is located on a first circular path around the rotation axis, and a second port of the plurality of ports is located on a second circular path around the rotation axis;

a first channel formed along the first circular path in an annular manner, and a second channel comprising a first coupling point, a second coupling point, and a third coupling point, wherein the first coupling point and the third coupling point are located on the first circular path, and the second coupling point is located on the second circular path, so that the second channel, together with a region of the first channel that is located between the first coupling point and the third coupling point, comprises a closed ring-shaped channel, wherein:

by rotating the rotor with respect to the stator, the second channel rotates relative to the first channel and the plurality of ports, or vice versa; and by rotating the rotor with respect to the stator, a fluidic coupling between the first port and the second port can be established, by the first channel being connected with the first port, the first channel being connected via the first coupling point and via the third coupling point with the second channel, and the second channel being connected at least via the second coupling point with the second port.

15. The fluid valve according to claim 1, wherein the fluidic coupling between the first port and the second port comprises a closed ring-shaped channel, and further comprising at least one of the following features:

the closed ring-shaped channel is not completely located on a circular path around the rotation axis;

the closed ring-shaped channel comprises different radial distances to the rotation axis;

the closed ring-shaped channel is not completely located within the same plane;

two or more parts of the closed ring-shaped channel are located on different sides of a boundary plane between the rotor and the stator.

16. A sample separation device for separating at least one sample component of a fluidic sample, the sample separation device comprising:

the fluid valve according to claim 1;

a pump for moving a mobile phase;

a separation column for separating different fractions of the sample in the mobile phase; and a sample injector for injecting the fluidic sample into the mobile phase in a separation path between the pump and the separation column, wherein, by moving the rotor relative to the stator, the fluid valve is switchable to inject the sample from the sample injector into the separation path.

17. A method for switching a fluid valve for a sample separation device for separating at least one sample component of a fluidic sample, the method comprising:

providing the fluid valve, wherein the fluid valve comprises:

a plurality of external terminals for fluidically connecting a respective fluidic component part;

a rotor and a stator, wherein, by rotating the rotor, different fluidic coupling states and/or decoupling states between fluidic component parts connected to the fluid valve are adjustable;

a first port and a second port respectively fluidically connected with at least one of the external terminals;

a first channel formed by the stator; and a second channel formed by the rotor, wherein, by rotating the rotor with respect to the stator, the second channel rotates relative to the first channel, the first portion, and the second port; and rotating the rotor with respect to the stator to fluidically couple the first channel with the second channel, so that a closed ring-shaped channel between the first port and the second port is established, and the first channel is connected with the first port, and the second channel is connected with the second port.

\* \* \* \* \*